(12) United States Patent
Sasaki et al.

(10) Patent No.: US 8,454,848 B2
(45) Date of Patent: Jun. 4, 2013

(54) METHOD OF MANUFACTURING PLASMON GENERATOR

(75) Inventors: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Kazuki Sato, Milpitas, CA (US); Kazumasa Yasuda, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 113 days.

(21) Appl. No.: 13/235,856

(22) Filed: Sep. 19, 2011

(65) Prior Publication Data

US 2013/0068722 A1    Mar. 21, 2013

(51) Int. Cl.
*B29D 11/00*     (2006.01)

(52) U.S. Cl.
USPC .............................................. 216/24; 216/22

(58) Field of Classification Search
USPC ........................................ 216/22, 24; 360/59
See application file for complete search history.

(56) References Cited

U.S. PATENT DOCUMENTS 7,330,404 B2    2/2008  Peng et al.

FOREIGN PATENT DOCUMENTS

JP    2006053978 A  *  2/2006

\* cited by examiner

*Primary Examiner* — Roberts Culbert
(74) *Attorney, Agent, or Firm* — Oliff & Berridge, PLC

(57) ABSTRACT

A method of manufacturing the plasmon generator includes the steps of: forming a base part made of a dielectric material; forming a metal film that is to later become the plasmon generator; and forming a filler layer made of a dielectric material. The base part includes a base surface and a protruding part that protrudes from the base surface. The protruding part has a top surface that is different in level from the base surface, and a first sidewall connecting the top surface of the protruding part to the base surface. The metal film includes an adhesion part adhering to the first sidewall. The filler layer has a second sidewall disposed such that the adhesion part is interposed between the first sidewall and the second sidewall.

20 Claims, 13 Drawing Sheets

METHOD OF MANUFACTURING PLASMON GENERATOR

BACKGROUND OF THE INVENTION

1. Field of the Invention

The present invention relates to a method of manufacturing a plasmon generator for use in thermally-assisted magnetic recording where a recording medium is irradiated with near-field light to lower the coercivity of the recording medium for data writing.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) for reading and a write head including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating the near-field light is typically guided through a waveguide, which is provided in the slider, to the plasmon generator disposed near a medium facing surface of the slider.

U.S. Pat. No. 7,330,404 discloses a technology in which the surface of the core of a waveguide and the surface of a plasmon generator are arranged to face each other with a gap therebetween, and evanescent light that occurs at the surface of the core based on the light propagating through the core is used to excite surface plasmons on the plasmon generator. Based on the excited surface plasmons, near-field light is produced.

The plasmon generator has a front end face located in the medium facing surface. The front end face includes a near-field light generating part which generates near-field light. The surface plasmons excited on the plasmon generator propagate along the surface of the plasmon generator to reach the near-field light generating part. As a result, the surface plasmons concentrate at the near-field light generating part, and the near-field light generating part generates near-field light based on the surface plasmons.

In order to reduce the track width of a recording medium for higher recording density, it is required to reduce the near-field light in spot diameter at the recording medium. To achieve this, it is required to reduce the width (the dimension in the track width direction) of the front end face of the plasmon generator.

The plasmon generator is typically manufactured by photolithography. One example of methods for manufacturing the plasmon generator by employing photolithography is to etch a metal film that is to become the plasmon generator, by using an etching mask formed of a photoresist. When forming the plasmon generator by such a method employing photolithography, however, it is difficult to reduce the minimum width of the plasmon generator due to the limit of photolithography, and as a result, the width of the front end face of the plasmon generator is also difficult to reduce.

OBJECT AND SUMMARY OF THE INVENTION

It is an object of the present invention to provide a method of manufacturing a plasmon generator and a method of manufacturing a near-field light generator that make it possible to provide a plasmon generator whose front end face including a near-field light generating part is small in width.

A plasmon generator manufactured by a manufacturing method of the present invention includes a propagation part for propagating a surface plasmon that is excited based on light. The propagation part has a bottom surface, a top surface opposite to the bottom surface, a first side surface and a second side surface that are opposite to each other and connect the top and bottom surfaces to each other, and a front end face that connects the top surface, the bottom surface, the first side surface and the second side surface to each other. The front end face includes a near-field light generating part that generates near-field light based on the surface plasmon.

The method of manufacturing the plasmon generator of the present invention includes the steps of: forming a base part that is made of a dielectric material and has a base surface and a protruding part, the protruding part protruding from the base surface and having a top surface and a first sidewall, the top surface of the protruding part being different from the base surface in level, the first sidewall connecting the top surface of the protruding part and the base surface to each other; forming a metal film after the step of forming the base part, the metal film being intended to later become the plasmon generator and including an adhesion part adhering to the first sidewall; and forming a filler layer after the step of forming the metal film, the filler layer being made of a dielectric material and having a second sidewall disposed such that the adhesion part is interposed between the first sidewall and the second sidewall.

The adhesion part includes a first contact surface that is in contact with the first sidewall, and a second contact surface that is in contact with the second sidewall. The first contact surface is to become the first side surface of the propagation part. The second contact surface is to become the second side surface of the propagation part.

In the method of manufacturing the plasmon generator of the present invention, the metal film may be formed by physical vapor deposition.

In the method of manufacturing the plasmon generator of the present invention, the metal film may further include a first deposition part formed on the base surface such that the adhesion part is interposed between the first sidewall and the first deposition part. In this case, the method of manufacturing the plasmon generator of the present invention may further include a step of removing the first deposition part between the step of forming the metal film and the step of forming the filler layer.

The method of manufacturing the plasmon generator of the present invention may further include a step of removing respective portions of the protruding part, the filler layer and the metal film that are located away from the base surface. The aforementioned step of removing is performed after the step of forming the filler layer. The aforementioned step of removing may include a step of polishing the protruding part, the filler layer and the metal film. The step of removing may further include a step of partially etching the protruding part, the filler layer and the metal film after the aforementioned step of polishing.

The metal film may further include a second deposition part formed at a position farther from the base surface than a position at which the adhesion part is formed. In this case, the aforementioned step of removing may include: a first etching step of etching at least a portion of the second deposition part; a step of polishing the protruding part, the filler layer and the metal film after the first etching step; and a second etching step of partially etching the protruding part, the filler layer and the metal film after the aforementioned step of polishing.

The plasmon generator of the present invention may include a width changing portion that is located on a side of the propagation part farther from the front end face and is connected to the propagation part. The width changing portion has a width in a direction parallel to the bottom surface and the front end face of the propagation part, the width of the width changing portion decreasing with increasing proximity to the front end face.

In the method of manufacturing the plasmon generator of the present invention, the step of forming the base part may include: a step of forming an etching stopper layer having the base surface; a step of forming a layer to be etched on the etching stopper layer, the layer to be etched being made of a material different from a material of the etching stopper layer; and a step of forming the protruding part by etching a portion of the layer to be etched, with the etching stopper layer used as an etching stopper.

The top surface of the propagation part may include an inclined portion. The distance from the bottom surface of the propagation part to an arbitrary point on the inclined portion may decrease with decreasing distance from the arbitrary point to the front end face. In this case, the method of manufacturing the plasmon generator of the present invention may further include a step of forming the inclined portion by etching a portion of the metal film, after the step of forming the filler layer.

A near-field light generator manufactured by a manufacturing method of the present invention includes a waveguide and a plasmon generator. The waveguide includes a core through which light propagates, and a cladding surrounding the core. The core has a top surface. The cladding includes a gap layer made of a dielectric material and having a top surface. The gap layer is disposed on the top surface of the core. The plasmon generator is disposed on the top surface of the gap layer.

The plasmon generator includes a propagation part for propagating a surface plasmon that is excited based on the light propagating through the core. The propagation part has a bottom surface, a top surface opposite to the bottom surface, a first side surface and a second side surface that are opposite to each other and connect the top and bottom surfaces to each other, and a front end face that connects the top surface, the bottom surface, the first side surface and the second side surface to each other. The front end face includes a near-field light generating part that generates near-field light based on the surface plasmon.

The method of manufacturing the near-field light generator of the present invention includes the steps of forming the waveguide; forming a protruding part on the top surface of the gap layer, the protruding part being made of a dielectric material and having a top surface and a first sidewall, the top surface of the protruding part being different from the top surface of the gap layer in level, the first sidewall connecting the top surface of the protruding part and the top surface of the gap layer to each other; forming a metal film after the step of forming the protruding part, the metal film being intended to later become the plasmon generator and including an adhesion part adhering to the first sidewall; and forming a filler layer after the step of forming the metal film, the filler layer being made of a dielectric material and having a second sidewall disposed such that the adhesion part is interposed between the first sidewall and the second sidewall.

The adhesion part includes a first contact surface that is in contact with the first sidewall, and a second contact surface that is in contact with the second sidewall. The first contact surface is to become the first side surface of the propagation part. The second contact surface is to become the second side surface of the propagation part.

In the method of manufacturing the near-field light generator of the present invention, the metal film may be formed by physical vapor deposition.

The metal film may further include a first deposition part formed on the top surface of the gap layer such that the adhesion part is interposed between the first sidewall and the first deposition part. In this case, the method of manufacturing the near-field light generator of the present invention may further include a step of removing the first deposition part between the step of forming the metal film and the step of forming the filler layer.

The method of manufacturing the near-field light generator of the present invention may further include a step of removing respective portions of the protruding part, the filler layer and the metal film that are located away from the top surface of the gap layer. The aforementioned step of removing is performed after the step of forming the filler layer. The aforementioned step of removing may include a step of polishing the protruding part, the filler layer and the metal film. The step of removing may further include a step of partially etching the protruding part, the filler layer and the metal film after the aforementioned step of polishing.

The metal film may further include a second deposition part formed at a position farther from the top surface of the gap layer than a position at which the adhesion part is formed. In this case, the aforementioned step of removing may include: a first etching step of etching at least a portion of the second deposition part; a step of polishing the protruding part, the filler layer and the metal film after the first etching step; and a second etching step of partially etching the protruding part, the filler layer and the metal film after the step of polishing.

In the method of manufacturing the near-field light generator of the present invention, the plasmon generator may include a width changing portion that is located on a side of the propagation part farther from the front end face and is connected to the propagation part. The width changing portion has a width in a direction parallel to the bottom surface and the front end face of the propagation part, the width of the width changing portion decreasing with increasing proximity to the front end face.

In the method of manufacturing the near-field light generator of the present invention, the step of forming the protruding part may include: a step of forming a layer to be etched on the top surface of the gap layer, the layer to be etched being made of a material different from a material of the gap layer; and a step of forming the protruding part by etching a portion of the layer to be etched, with the gap layer used as an etching stopper.

The top surface of the propagation part may include an inclined portion. The distance from the bottom surface of the propagation part to an arbitrary point on the inclined portion may decrease with decreasing distance from the arbitrary point to the front end face. In this case, the method of manufacturing the near-field light generator of the present invention may further include a step of forming the inclined portion by etching a portion of the metal film, after the step of forming the filler layer.

According to the method of manufacturing the plasmon generator and the method of manufacturing the near-field light generator of the present invention, the metal film formed in the step of forming the metal film has the adhesion part adhering to the first sidewall, and the width of the adhesion part defines the width of the propagation part of the plasmon generator. The width of the adhesion part can be easily reduced regardless of the limit of photolithography. As such, according to the present invention, it is possible to manufacture a plasmon generator whose front end face including the near-field light generating part is small in width.

Other and further objects, features and advantages of the present invention will appear more fully from the following description.

DETAILED DESCRIPTION OF THE PREFERRED EMBODIMENTS

[First Embodiment]

Figure 3:
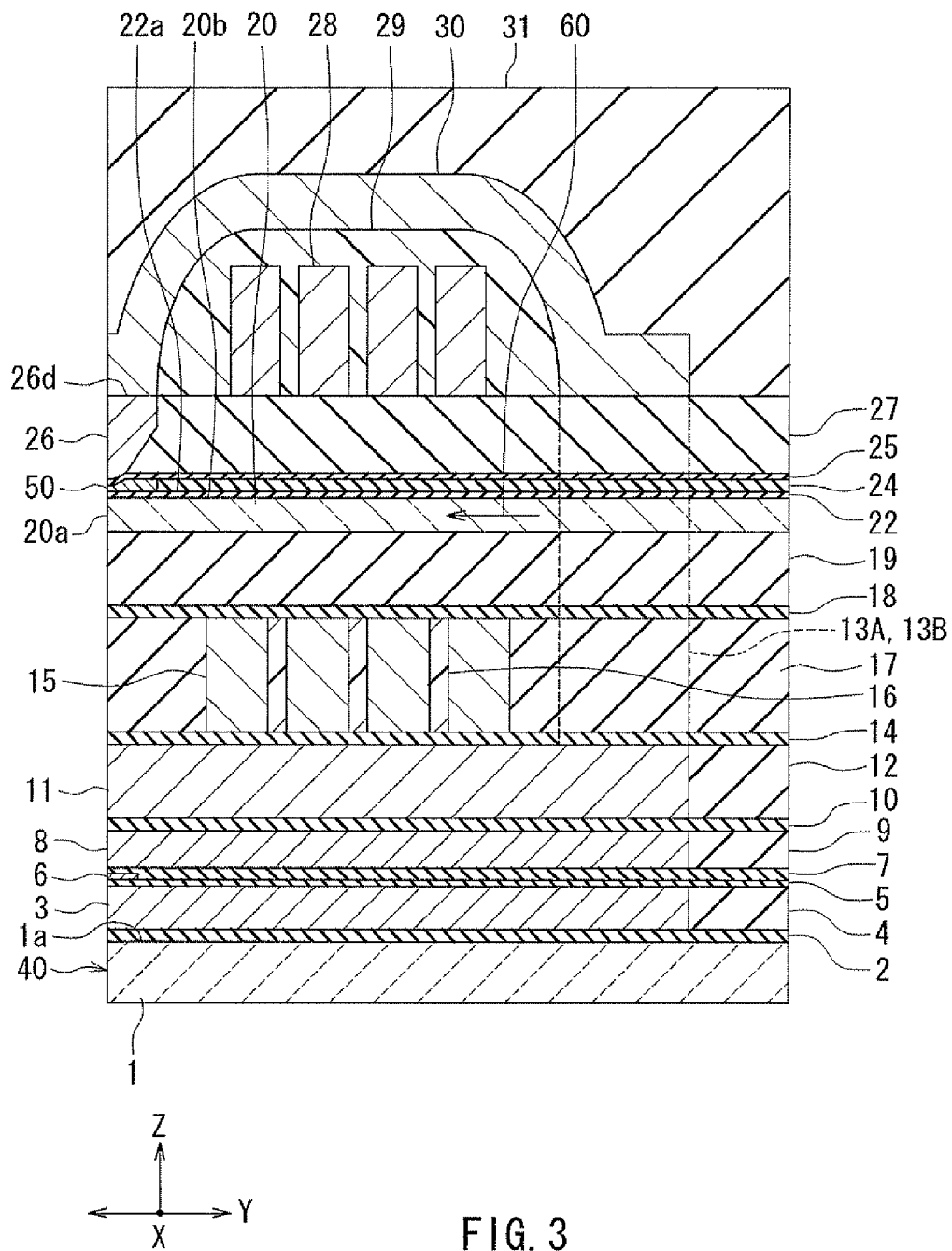
FIG. 3 is a cross-sectional view showing the configuration of the thermally-assisted magnetic recording head of the first embodiment of the invention.
Figure 4:
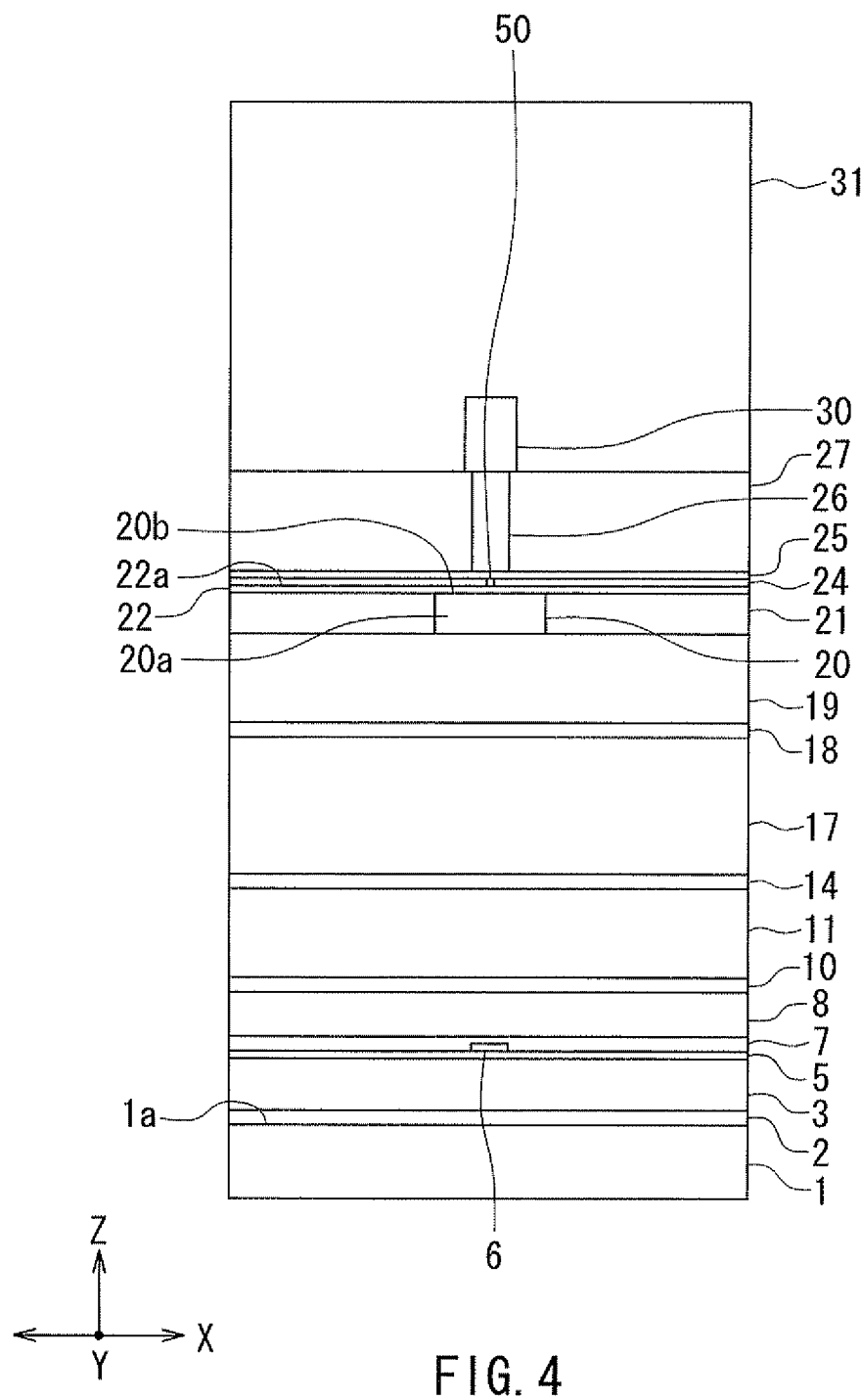
FIG. 4 is a front view showing the medium facing surface of the thermally-assisted magnetic recording head of the first embodiment of the invention.

Embodiments of the present invention will now be described in detail with reference to the drawings. First, reference is made to FIG. 3 and FIG. 4 to describe the configuration of a thermally-assisted magnetic recording head of a first embodiment of the invention. FIG. 3 is a cross-sectional view showing the configuration of the thermally-assisted magnetic recording head. FIG. 4 is a front view showing the medium facing surface of the thermally-assisted magnetic recording head.

The thermally-assisted magnetic recording head of the present embodiment is for use in perpendicular magnetic recording, and is in the form of a slider to fly over the surface of a recording medium that rotates. When the recording medium rotates, an airflow passing between the recording medium and the slider causes a lift to be exerted on the slider. The slider is configured to fly over the surface of the recording medium by means of the lift.

As shown in FIG. 3, the thermally-assisted magnetic recording head has a medium facing surface 40 that faces the recording medium. Here, X direction, Y direction, and Z direction will be defined as follows. The X direction is the direction across the tracks of the recording medium, i.e., the track width direction. The Y direction is a direction perpendicular to the medium facing surface 40. The Z direction is the direction of travel of the recording medium as viewed from the slider. The X, Y, and Z directions are orthogonal to one another.

As shown in FIG. 3 and FIG. 4, the thermally-assisted magnetic recording head includes: a substrate 1 made of a ceramic material such as aluminum oxide-titanium carbide ($Al_2O_3$—TiC) and having a top surface 1a; an insulating layer 2 made of an insulating material and disposed on the top surface 1a of the substrate 1; a bottom shield layer 3 made of a magnetic material and disposed on the insulating layer 2; and an insulating layer 4 disposed on the insulating layer 2 and surrounding the bottom shield layer 3. The insulating layers 2 and 4 are made of alumina ($Al_2O_3$), for example. The Z direction is also a direction perpendicular to the top surface 1a of the substrate 1.

The thermally-assisted magnetic recording head further includes: a bottom shield gap film 5 which is an insulating film disposed over the top surfaces of the bottom shield layer 3 and the insulating layer 4; a magnetoresistive (MR) element 6 serving as a read element disposed on the bottom shield gap film 5; two leads (not shown) connected to the MR element 6; and a top shield gap film 7 which is an insulating film disposed on the MR element 6.

An end of the MR element 6 is located in the medium facing surface 40 facing the recording medium. The MR element 6 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The thermally-assisted magnetic recording head further includes a top shield layer 8 made of a magnetic material and disposed on the top shield gap film 7, and an insulating layer 9 disposed on the top shield gap film 7 and surrounding the top shield layer 8. The insulating layer 9 is made of alumina, for example. The parts from the bottom shield layer 3 to the top shield layer 8 constitute a read head.

The thermally-assisted magnetic recording head further includes a nonmagnetic layer 10 made of a nonmagnetic material and disposed over the top shield layer 8 and the insulating layer 9, a return pole layer 11 made of a magnetic material and disposed on the nonmagnetic layer 10, and an insulating layer 12 disposed on the nonmagnetic layer 10 and surrounding the return pole layer 11. The return pole layer 11 has an end face located in the medium facing surface 40. The nonmagnetic layer 10 and the insulating layer 12 are made of alumina, for example.

The thermally-assisted magnetic recording head further includes two coupling portions 13A and 13B disposed away from the medium facing surface 40 and lying on part of the return pole layer 11, an insulating layer 14 disposed on another part of the return pole layer 11 and on the insulating layer 12, and a coil 15 disposed on the insulating layer 14. The coupling portions 13A and 13B are made of a magnetic material. Each of the coupling portions 13A and 13B has a first layer located on the return pole layer 11, and a second, a third, a fourth, and a fifth layer stacked in this order on the first layer. The first layer of the coupling portion 13A and the first layer of the coupling portion 13B are arranged to align in the track width direction (the X direction). The coil 15 is planar spiral-shaped and wound around the first layers of the coupling portions 13A and 13B. The coil 15 is made of a conductive material such as copper. The insulating layer 14 is made of alumina, for example.

The thermally-assisted magnetic recording head further includes an insulating layer 16 disposed in the space between every adjacent turns of the coil 15, an insulating layer 17 disposed around the coil 15, and an insulating layer 18 disposed over the coil 15 and the insulating layers 16 and 17. The insulating layer 16 is made of photoresist, for example. The insulating layers 17 and 18 are made of alumina, for example. The first layers of the coupling portions 13A and 13B are embedded in the insulating layers 14 and 17.

The thermally-assisted magnetic recording head further includes a wave guide including a core 20 and a cladding. The cladding surrounds the core 20. The core 20 has an end face 20a closer to the medium facing surface 40, and a top surface 20b. The end face 20a may be located in the medium facing surface 40 or at a distance from the medium facing surface 40. FIG. 3 and FIG. 4 illustrate an example in which the end face 20a is located in the medium facing surface 40.

The cladding includes cladding layers 19 and 21, and a gap layer 22 having a top surface 22a. The cladding layer 19 is disposed on the insulating layer 18. The core 20 is disposed on the cladding layer 19. The cladding layer 21 is disposed on the cladding layer 19 and surrounds the core 20. The top surface 20b of the core 20 and the top surface of the cladding layer 21 are even with each other. The gap layer 22 is disposed over the top surface 20b of the core 20 and the top surface of the cladding layer 21.

The core 20 is made of a dielectric material that transmits laser light to be used for generating near-field light. The laser light emitted from a not-shown laser diode enters the core 20 and propagates through the core 20. The cladding layers 19 and 21 and the gap layer 22 are each made of a dielectric material that has a refractive index lower than that of the core 20. For example, the core 20 can be made of tantalum oxide such as $Ta_2O_5$ or silicon oxynitride (SiON), whereas the cladding layers 19 and 21 and the gap layer 22 can be made of silicon dioxide ($SiO_2$) or alumina.

The second layers of the coupling portions 13A and 13B are embedded in the insulating layer 18 and the cladding layer 19. The third layers of the coupling portions 13A and 13B are embedded in the cladding layer 21. The third layer of the coupling portion 13A and the third layer of the coupling portion 13B are located on opposite sides of the core 20 in the track width direction (the X direction) and are each spaced from the core 20.

The thermally-assisted magnetic recording head further includes a plasmon generator 50 disposed on the top surface 22a of the gap layer 22 in the vicinity of the medium facing surface 40, a dielectric layer 24 disposed on the top surface 22a of the gap layer 22 and surrounding the plasmon generator 50, and a dielectric layer 25 disposed over the plasmon generator 50 and the dielectric layer 24. The fourth layers of the coupling portions 13A and 13B are embedded in the gap layer 22 and the dielectric layer 24.

The plasmon generator 50 is made of a metal. More specifically, the plasmon generator 50 is made of one of Au, Ag, Al, Cu, Pd, Pt, Rh and Ir, or of an alloy composed of two or more of these elements. A detailed description will be made later as to the shape of the plasmon generator 50.

The dielectric layer 24 is made of a dielectric material different from the material used for the gap layer 22. If alumina is selected as the material for the gap layer 22, $SiO_2$ may be selected as the material for the dielectric layer 24, for example. The dielectric layer 25 is made of alumina, for example.

The thermally-assisted magnetic recording head further includes a main pole 26, and a dielectric layer 27 surrounding the main pole 26. The main pole 26 is made of a magnetic material and disposed on the dielectric layer 25 such that the plasmon generator 50 is interposed between the core 20 and the main pole 26. The fifth layers of the coupling portions 13A and 13B are embedded in the dielectric layers 25 and 27. The top surfaces of the main pole 26, the dielectric layer 27, and the fifth layers of the coupling portions 13A and 13B are even with each other. The dielectric layer 27 is made of $SiO_2$, for example. The shape of the main pole 26 will be described in detail later.

The thermally-assisted magnetic recording head further includes a coil 28 disposed on the dielectric layer 27, an insulating layer 29 disposed to cover the coil 28, and a yoke layer 30 made of a magnetic material and disposed over the main pole 26, the coupling portions 13A and 13B, the dielectric layer 27 and the insulating layer 29. The yoke layer 30 magnetically couples the main pole 26 to the coupling portions 13A and 13B. The coil 28 is planar spiral-shaped and wound around part of the yoke layer 30 lying on the coupling portions 13A and 13B. The coil 28 is made of a conductive material such as copper. The insulating layer 29 is made of photoresist, for example.

The thermally-assisted magnetic recording head further includes a protective layer 31 disposed to cover the yoke layer 30. The protective layer 31 is made of alumina, for example.

The parts from the return pole layer 11 to the yoke layer 30 constitute a write head. The coils 15 and 28 produce magnetic fields corresponding to data to be written on the recording medium. The return pole layer 11, the coupling portions 13A and 13B, the yoke layer 30, and the main pole 26 form a magnetic path for passing magnetic fluxes corresponding to the magnetic fields produced by the coils 15 and 28. The coils 15 and 28 are connected in series or in parallel so that the magnetic flux corresponding to the magnetic field produced by the coil 15 and the magnetic flux corresponding to the magnetic field produced by the coil 28 flow in the same direction through the main pole 26. The main pole 26 allows the magnetic flux corresponding to the magnetic field produced by the coil 15 and the magnetic flux corresponding to the magnetic field produced by the coil 28 to pass, and produces a write magnetic field for writing data on the recording medium by means of a perpendicular magnetic recording system.

As has been described, the thermally-assisted magnetic recording head of the present embodiment includes the medium facing surface 40, the read head, and the write head. The medium facing surface 40 faces the recording medium. The read head and the write head are stacked on the substrate 1. Relative to the read head, the write head is located forward along the direction of travel of the recording medium (the Z direction) (i.e., located on the trailing side).

The read head includes: the MR element 6 serving as the read element; the bottom shield layer 3 and the top shield layer 8 for shielding the MR element 6, the bottom shield layer 3 and the top shield layer 8 having their respective portions that are located near the medium facing surface 40 and are opposed to each other with the MR element 6 therebetween; the bottom shield gap film 5 disposed between the MR element 6 and the bottom shield layer 3; and the top shield gap film 7 disposed between the MR element 6 and the top shield layer 8.

The write head includes the coils 15 and 28, the main pole 26, and a near-field light generator according to the present embodiment. The near-field light generator includes the waveguide and the plasmon generator 50. The waveguide includes the core 20 through which light propagates, and the cladding surrounding the core 20. In the present embodiment, in particular, the core 20 allows laser light emitted from a not-shown laser diode to propagate through. The cladding includes the cladding layers 19 and 21 and the gap layer 22.

The core 20 has the top surface 20b. The gap layer 22 has the top surface 22a, and is disposed on the top surface 20b of the core 20. The plasmon generator 50 is disposed on the top surface 22a of the gap layer 22.

Figure 1:
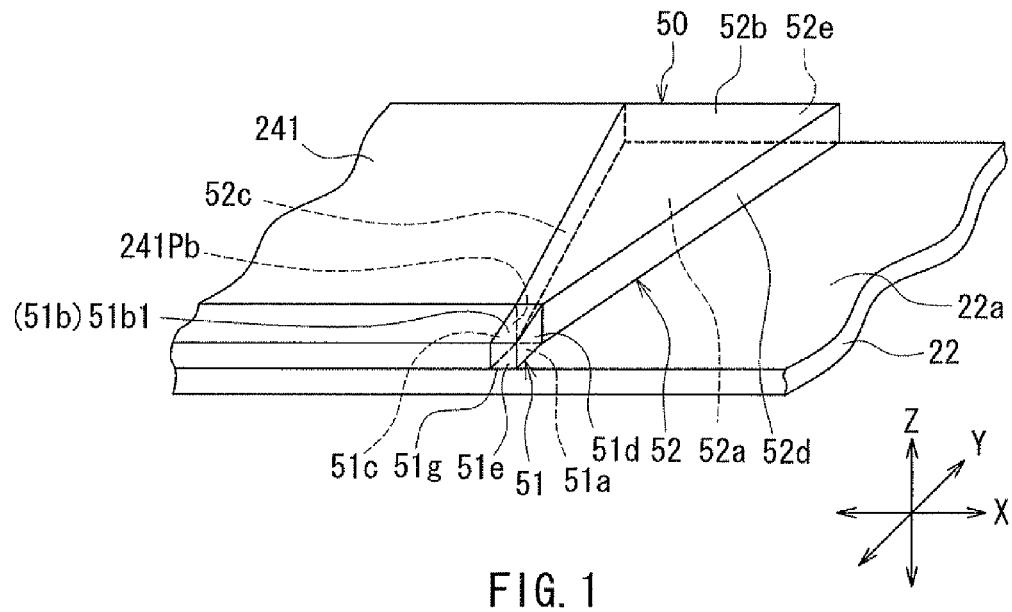
FIG. 1 is a perspective view showing a plasmon generator according to a first embodiment of the invention.
Figure 2:
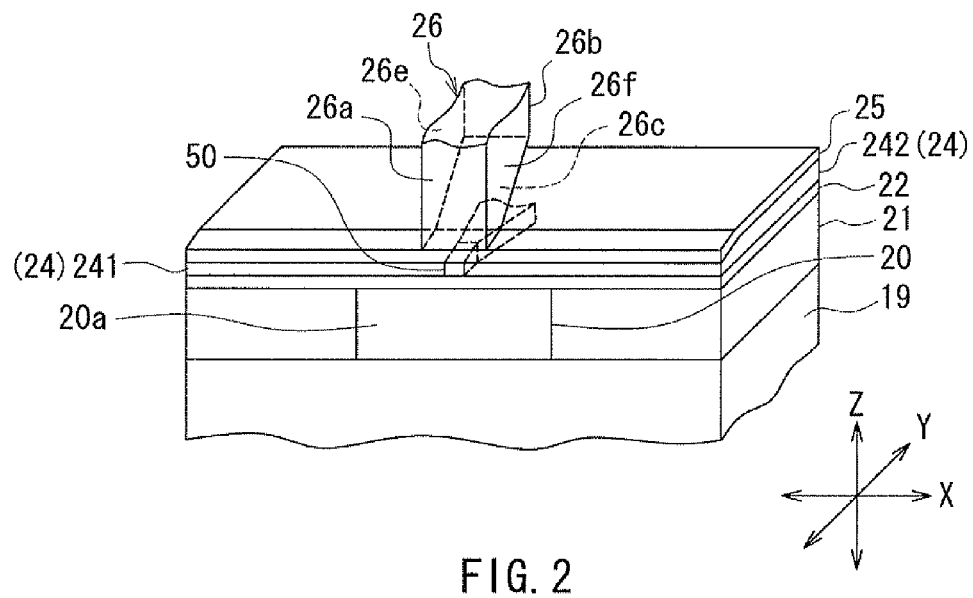
FIG. 2 is a perspective view showing the main part of a thermally-assisted magnetic recording head of the first embodiment of the invention.

Now, the shape of the plasmon generator 50 will be described in detail with reference to FIG. 1 and FIG. 2. FIG. 1 is a perspective view showing the plasmon generator 50. FIG. 2 is a perspective view showing the main part of the thermally-assisted magnetic recording head. As shown in FIG. 1, the plasmon generator 50 includes a propagation part 51 that is located near the medium facing surface 40, and a width changing portion 52 that is located farther from the medium facing surface 40 than is the propagation part 51.

The propagation part 51 has: a bottom surface 51a; a top surface 51b opposite to the bottom surface 51a; a first side surface 51c and a second side surface 51d opposite to each other and connecting the bottom surface 51a and the top surface 51b to each other; and a front end face 51e located in the medium facing surface 40 and connecting the bottom surface 51a, the top surface 51b, the first side surface 51c, and the second side surface 51d to each other.

The bottom surface 51a is parallel to the top surface 1a of the substrate 1, and faces the top surface 20b of the core 20 with a predetermined spacing therebetween. The front end face 51e includes a near-field light generating part 51g that lies at an end of the bottom surface 51a and generates near-field light based on surface plasmons.

The top surface 51b includes an inclined portion 51b1. The distance from the bottom surface 51a of the propagation part 51 to an arbitrary point on the inclined portion 51b1 decreases with decreasing distance from the arbitrary point to the front end face 51e. The top surface 51b may include a flat portion that is located closer to or farther from the medium facing surface 40 than is the inclined portion 51b1 and continuous with the inclined portion 51b1. The flat portion is parallel to the bottom surface 51a.

For example, the propagation part 51 is rectangular in cross section parallel to the medium facing surface 40. The width of the propagation part 51 in a direction parallel to the medium facing surface 40 and the top surface 1a of the substrate 1 (the X direction) may be constant regardless of the distance from the medium facing surface 40 or may decrease with increasing proximity to the medium facing surface 40. The width (the dimension in the track width direction (the X direction)) of the front end face 51e is defined by the width of the propagation part 51 in the medium facing surface 40. The width of the front end face 51e falls within the range of 5 to 50 nm, for example.

The width changing portion 52 is located on a side of the propagation part 51 farther from the front end face 51e and is connected to the propagation part 51. The width changing portion 52 has: a bottom surface 52a; a top surface 52b opposite to the bottom surface 52a; a first side surface 52c and a second side surface 52d opposite to each other and connecting the bottom surface 52a and the top surface 52b to each other; and a rear end face 52e connecting the bottom surface 52a, the top surface 52b, the first side surface 52c, and the second side surface 52d to each other.

The bottom surface 52a is located farther from the medium facing surface 40 than is the bottom surface 51a of the propagation part 51, and is continuous with the bottom surface 51a. The top surface 52b is located farther from the medium facing surface 40 than is the top surface 51b of the propagation part 51, and is continuous with the top surface 51b. The first side surface 52c is located farther from the medium facing surface 40 than is the first side surface 51c of the propagation part 51, and is continuous with the first side surface 51c. The second side surface 52d is located farther from the medium facing surface 40 than is the second side surface 51d of the propagation part 51, and is continuous with the second side surface 51d.

For example, the width changing portion 52 is rectangular in cross section parallel to the medium facing surface 40. The width changing portion 52 has a width in a direction parallel to the bottom surface 51a and the front end face 51e of the propagation part 51 (the same direction as the direction parallel to the medium facing surface 40 and the top surface 1a of the substrate 1). The width of the width changing portion 52 decreases with increasing proximity to the front end face 51e, and becomes equal to the width of the propagation part 51 at the boundary with the propagation part 51. The width of the bottom surface 52a of the width changing portion 52 facing the top surface 20b of the core 20 decreases with increasing proximity to the medium facing surface 40, and becomes equal to the width of the bottom surface 51a of the propagation part 51 at the boundary with the bottom surface 51a.

The planar shape of the plasmon generator 50 is defined by the dielectric layer 24. The dielectric layer 24 has a first portion 241 and a second portion 242 located on opposite sides of the plasmon generator 50 in the track width direction (the X direction). The first portion 241 has a first sidewall 241Pb that is in contact with the first side surface 51c of the propagation part 51. Although not illustrated, the second portion 242 has a second sidewall that is in contact with the second side surface 51d of the propagation part 51. FIG. 1 shows a state with the second portion 242 eliminated.

An example of the shape of the main pole 26 will now be described with reference to FIG. 2 and FIG. 3. The main pole 26 has a front end face 26a located in the medium facing surface 40, a rear end face 26b opposite to the front end face 26a, a bottom surface 26c, a top surface 26d, and two side surfaces 26e and 26f. A portion of the bottom surface 26c is opposed to the inclined portion 51b1 of the top surface 51b of the propagation part 51 with the dielectric layer 25 therebetween. The distance from the top surface 1a of the substrate 1 to an arbitrary point on the bottom surface 26c increases with increasing distance from the arbitrary point to the medium facing surface 40. Note that the shape of the main pole 26 is not limited to the foregoing example described with reference to FIG. 2 and FIG. 3.

Now, the principle of generation of near-field light in the present embodiment and the principle of thermally-assisted magnetic recording using the near-field light will be described in detail. Laser light emitted from a not-shown laser diode enters the core 20. As shown in FIG. 3, the laser light 60 propagates through the core 20 toward the medium facing surface 40, and reaches the vicinity of the plasmon generator 50. The laser light 60 is then totally reflected at the top surface 20b of the core 20. This generates evanescent light permeating into the gap layer 22. As a result, surface plasmons are excited at least on the bottom surface 52a of the width changing portion 52 of the plasmon generator 50 through coupling with the evanescent light.

The surface plasmons excited on the bottom surface 52a of the width changing portion 52 propagate through the bottom surface 52a to reach the bottom surface 51a of the propagation part 51, and further propagates through the bottom surface 51a to reach the near-field light generating part 51g. Consequently, the surface plasmons concentrate at the near-field light generating part 51g, and the near-field light generating part 51g generates near-field light based on the surface plasmons. The near-field light is projected toward the recording medium, reaches the surface of the recording medium and heats a part of the magnetic recording layer of the recording medium. This lowers the coercivity of the part of the magnetic recording layer. In thermally-assisted magnetic recording, the part of the magnetic recording layer with the lowered coercivity is subjected to a write magnetic field produced by the main pole 26 for data writing.

Now, with reference to FIG. 3 and FIG. 4, a description will be given of a method of manufacturing the thermally-assisted magnetic recording head of the present embodiment. The method of manufacturing the thermally-assisted magnetic recording head of the present embodiment includes the steps of forming components of a plurality of thermally-assisted magnetic recording heads other than the substrates 1 on a substrate that includes portions to become the substrates 1 of the plurality of thermally-assisted magnetic recording heads, thereby fabricating a substructure that includes rows of a plurality of pre-head portions that are to later become the plurality of thermally-assisted magnetic recording heads; and forming the plurality of thermally-assisted magnetic recording heads by cutting the substructure to separate the plurality of pre-head portions from each other. In the step of forming the plurality of thermally-assisted magnetic recording heads, the cut surfaces are polished into the medium facing surfaces 40.

The method of manufacturing the thermally-assisted magnetic recording head of the present embodiment will now be described in more detail with attention focused on a single thermally-assisted magnetic recording head. In the method of manufacturing the thermally-assisted magnetic recording head of the present embodiment, first, the insulating layer 2 is formed on the substrate 1. The bottom shield layer 3 is then formed on the insulating layer 2. Next, the insulating layer 4 is formed to cover the bottom shield layer 3. The insulating layer 4 is then polished by, for example, chemical mechanical polishing (hereinafter referred to as CMP), until the bottom shield layer 3 is exposed.

Next, the bottom shield gap film 5 is formed over the bottom shield layer 3 and the insulating layer 4. Next, the MR element 6 and not-shown two leads connected to the MR element 6 are formed on the bottom shield gap film 5. The top shield gap film 7 is then formed to cover the MR element 6 and the leads. The top shield layer 8 is then formed on the top shield gap film 7. Next, the insulating layer 9 is formed to cover the top shield layer 8. The insulating layer 9 is then polished by, for example, CMP, until the top shield layer 8 is exposed.

Next, the nonmagnetic layer 10 is formed over the top shield layer 8 and the insulating layer 9. The return pole layer 11 is then formed on the nonmagnetic layer 10. Next, the insulating layer 12 is formed to cover the return pole layer 11. The insulating layer 12 is then polished by, for example, CMP, until the return pole layer 11 is exposed. Next, the insulating layer 14 is formed over the return pole layer 11 and the insulating layer 12.

The insulating layer 14 is then selectively etched to form therein two openings for exposing the top surface of the return pole layer 11. Next, the first layers of the coupling portions 13A and 13B are formed on the return pole layer 11. Next, the coil 15 is formed on the insulating layer 14. The insulating layer 16 is then formed in the space between every adjacent turns of the coil 15. Next, the insulating layer 17 is formed over the entire top surface of the stack. The insulating layer 17 is then polished by, for example, CMP, until the first layers of the coupling portions 13A and 13B, the coil 15, and the insulating layer 16 are exposed. The top surfaces of the first layers of the coupling portions 13A and 13B, the coil 15, and the insulating layers 16 and 17 are thereby made even with each other. Next, the insulating layer 18 is formed over the first layers of the coupling portions 13A and 13B, the coil 15, and the insulating layers 16 and 17.

The insulating layer 18 is then selectively etched to form therein openings for exposing the top surfaces of the first layers of the coupling portions 13A and 13B. Next, the second layers of the coupling portions 13A and 13B are formed on the first layers of the coupling portions 13A and 13B. Next, the cladding layer 19 is formed to cover the second layers of the coupling portions 13A and 13B. The cladding layer 19 is then polished by, for example, CMP, until the second layers of the coupling portions 13A and 13B are exposed.

Next, the third layers of the coupling portions 13A and 13B are formed on the second layers of the coupling portions 13A and 13B. Next, the core 20 is formed on the cladding layer 19. Next, the cladding layer 21 is formed over the entire top surface of the stack. The cladding layer 21 is then polished by, for example, CMP, until the third layers of the coupling portions 13A and 13B and the core 20 are exposed. The top surfaces of the third layers of the coupling portions 13A and 13B, the core 20, and the cladding layer 21 are thereby made even with each other. Next, the gap layer 22 is formed over the third layers of the coupling portions 13A and 13B, the core 20, and the cladding layer 21.

The gap layer 22 is then selectively etched to form therein openings for exposing the top surfaces of the third layers of the coupling portions 13A and 13B. Next, the fourth layers of the coupling portions 13A and 13B are formed on the third layers of the coupling portions 13A and 13B. Next, the plasmon generator 50 and the dielectric layer 24 are formed on the gap layer 22. Next, the dielectric layer 25 is formed over the fourth layers of the coupling portions 13A and 13B, the plasmon generator 50, and the dielectric layer 24. The process for forming the plasmon generator 50 will be described in detail later.

Next, the dielectric layer 25 is selectively etched to form therein openings for exposing the top surfaces of the fourth layers of the coupling portions 13A and 13B. The fifth layers of the coupling portions 13A and 13B are then formed on the fourth layers of the coupling portions 13A and 13B. Next, the dielectric layer 27 is formed to cover the fifth layers of the coupling portions 13A and 13B. The dielectric layer 27 is then polished by, for example, CMP, until the fifth layers of the coupling portions 13A and 13B are exposed.

Next, the dielectric layer 27 is taper-etched by, for example, reactive ion etching (hereinafter referred to as RIE) or ion beam etching (hereinafter referred to as IBE) to provide the dielectric layer 27 with an accommodation part for accommodating the main pole 26. The main pole 26 is then formed in the accommodation part of the dielectric layer 27. Next, the coil 28 is formed on the dielectric layer 27. The insulating layer 29 is then formed to cover the coil 28. Next, the yoke layer 30 is formed over the main pole 26, the fifth layers of the coupling portions 13A and 13B, the dielectric layer 27, and the insulating layer 29. Next, the protective layer 31 is formed to cover the yoke layer 30. Wiring, terminals, and other components are then formed on the top surface of the protective layer 31.

When the substructure is completed thus, the substructure is cut to separate the plurality of pre-head portions from each other, followed by the polishing of the medium facing surface 40 and the fabrication of flying rails etc. This completes the thermally-assisted magnetic recording head.

Now, a method of manufacturing the near field light generator according to the present embodiment will be described. The method of manufacturing the near-field light generator according to the present embodiment includes the step of forming the waveguide and the step of forming the plasmon generator 50. The step of forming the waveguide includes the steps of forming the cladding layer 19, forming the core 20, forming the cladding layer 21, and forming the gap layer 22.

Reference is now made to FIG. 5A to FIG. 11A and FIG. 5B to FIG. 11B to describe the step of forming the plasmon generator 50 in detail. The following description includes the description of the method of manufacturing the plasmon generator 50 according to the present embodiment. FIG. 5A to FIG. 11A each show the top surface of a stack of layers formed in the process of manufacturing the near-field light generator. FIG. 5B to FIG. 11B each show a cross section of the stack taken at the position where the medium facing surface 40 is to be formed. The symbol "ABS" in FIG. 5A to FIG. 11A indicates the position where the medium facing surface 40 is to be formed.

Figure 5A:
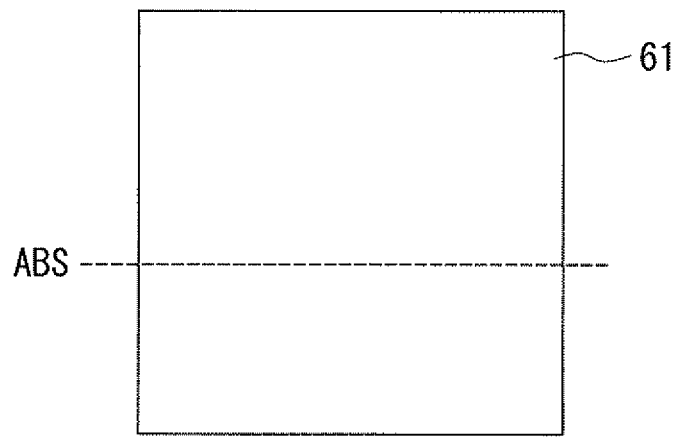
FIG. 5A and FIG. 5B are explanatory diagrams showing a step of a method of manufacturing a near-field light generator according to the first embodiment of the invention.
Figure 5B:
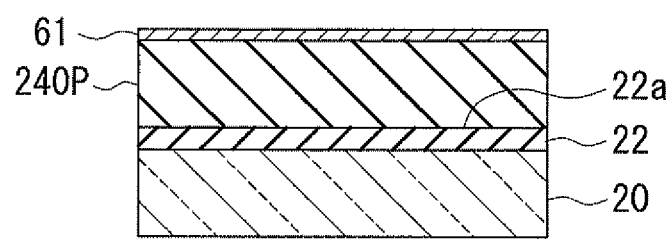

In the step of forming the plasmon generator 50, first, a protruding part made of a dielectric material is formed on the top surface 22a of the gap layer 22. This step will be described below with reference to FIG. 5A, FIG. 5B, FIG. 6A, and FIG. 6B. FIG. 5A and FIG. 5B show a step that follows the formation of the fourth layers of the coupling portions 13A and 13B. In this step, first, a layer to be etched 240P is formed on the top surface 22a of the gap layer 22. The layer to be etched 240P is made of a dielectric material different from the material used for the gap layer 22. The layer to be etched 240P is to be partially etched into the protruding part. If the gap layer 22 is formed of alumina, the layer to be etched 240P may be formed of $SiO_2$, for example. Next, a mask layer 61 of Ru is formed on the top surface of the layer to be etched 240P.

Figure 6A:
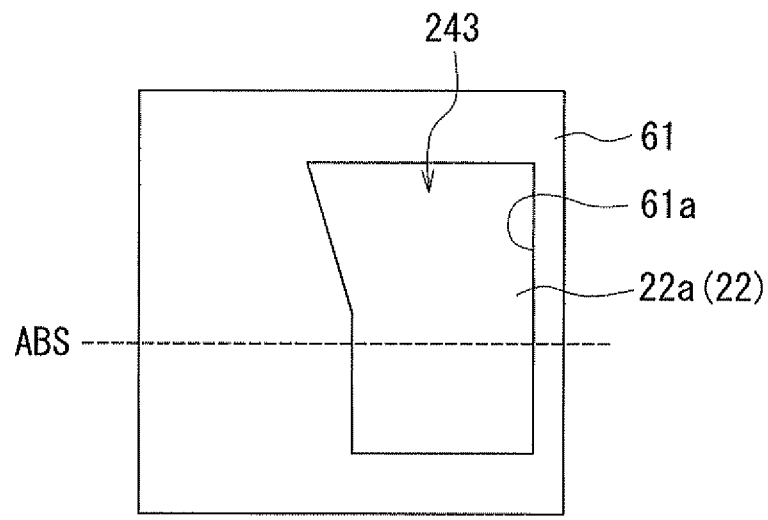
FIG. 6A and FIG. 6B are explanatory diagrams showing a step that follows the step shown in FIG. 5A and FIG. 5B.
Figure 6B:
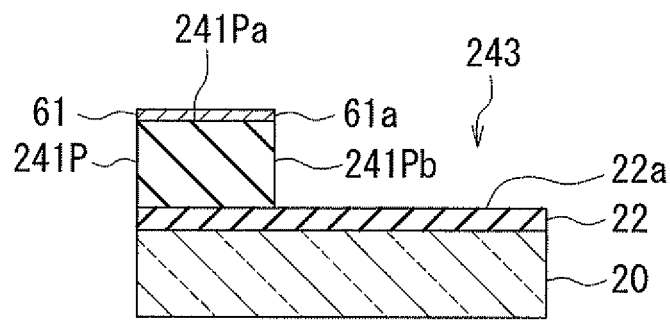

FIG. 6A and FIG. 6B show the next step. In this step, first, a not-shown photoresist mask is formed on the mask layer 61. The photoresist mask has an opening for exposing part of the top surface of the mask layer 61. The photoresist mask is formed by patterning a photoresist layer by photolithography. Using the photoresist mask as an etching mask, a portion of the mask layer 61 exposed from the opening of the photoresist mask is then removed by IBE, for example. This provides the mask layer 61 with an opening 61a for exposing part of the top surface of the layer to be etched 240P. The rim of the opening 61a includes a portion for defining the position of the first sidewall 241Pb and a portion for defining the position of the first side surface 52c of the width changing portion 52. The not-shown photoresist mask is then removed.

Next, using the mask layer 61 as an etching mask, a portion of the layer to be etched 240P that is exposed from the opening 61a of the mask layer 61 is etched and removed by, for example, RIE. In this etching, the gap layer 22 serves as an etching stopper for stopping the etching. This etching provides the layer 240P with an opening 243 for exposing part of the top surface 22a of the gap layer 22. Etching the portion of the layer 240P as described above forms a protruding part 241P of a dielectric material on the top surface 22a of the gap layer 22. The protruding part 241P has a top surface 241Pa and a first sidewall 241Pb. The top surface 241Pa is different in level from the top surface 22a of the gap layer 22. The first sidewall 241Pb connects the top surface 241Pa of the protruding part 241P and the top surface 22a of the gap layer 22 to each other. The protruding part 241P is to later become the first portion 241 of the dielectric layer 24.

A stack consisting of the gap layer 22 and the protruding part 241P corresponds to the "base part" in the method of manufacturing the plasmon generator of the present invention. The top surface 22a of the gap layer 22 corresponds to the "base surface" in the method of manufacturing the plasmon generator of the present invention.

Figure 7A:
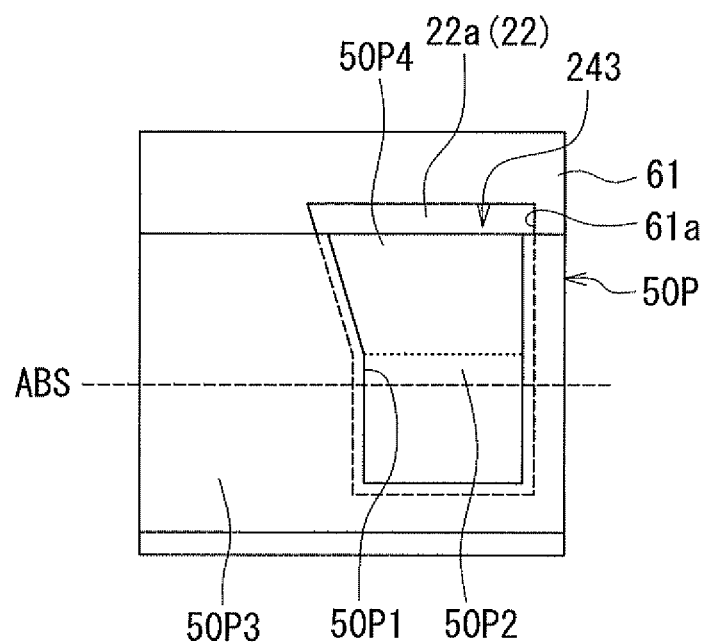
FIG. 7A and FIG. 7B are explanatory diagrams showing a step that follows the step shown in FIG. 6A and FIG. 6B.
Figure 7B:
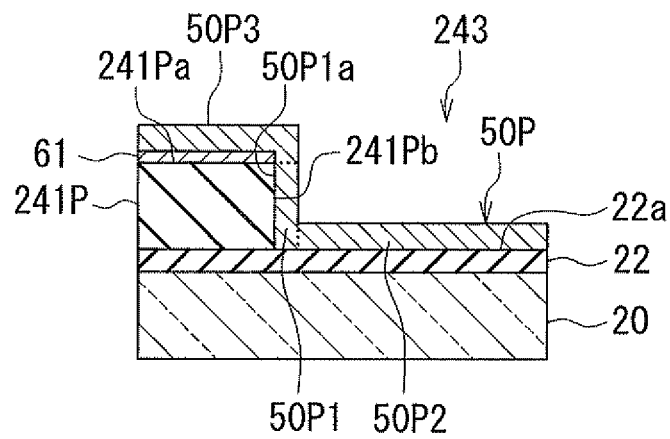

FIG. 7A and FIG. 7B show the next step. In this step, a metal film 50P, which is to later become the plasmon generator 50, is formed on part of the top surface of the stack shown in FIG. 6A and FIG. 6B by a lift-off process, for example. More specifically, first, a not-shown photoresist mask having an opening is formed on the stack shown in FIG. 6A and FIG. 6B. The photoresist mask is formed by patterning a photoresist layer by photolithography. The opening exposes at least a region on the stack shown in FIG. 6A and FIG. 6B where the plasmon generator 50 is to be disposed later. The region includes part of the top surface 241Pa of the protruding part 241P, part of the top surface 22a of the gap layer 22, and the first sidewall 241Pb. The rim of the opening includes a portion for defining the position of the rear end face 52e of the width changing portion 52. Next, the metal film 50P is formed over the entire stack including the aforementioned photoresist mask by physical vapor deposition such as sputtering. Next, the photoresist mask is lifted off. In this way, the metal film 50P is formed over part of the top surface 241Pa of the protruding part 241P, part of the top surface 22a of the gap layer 22, and the first sidewall 241Pb.

The metal film 50P includes: an adhesion part 50P1 adhering to the first sidewall 241Pb; a first deposition part 50P2 formed on the top surface 22a of the gap layer 22 such that the adhesion part 50P1 is interposed between the first sidewall 241Pb and the first deposition part 50P2; and a second deposition part 50P3 formed at a position farther from the top surface 22a of the gap layer 22 than the position at which the adhesion part 50P1 is formed. The adhesion part 50P1 is formed by the adhesion of the metal material forming the metal film 50P onto the first sidewall 241Pb. The first deposition part 50P2 is formed by the deposition of the metal material forming the metal film 50P onto the top surface 22a of the gap layer 22. The second deposition part 50P3 is formed by the deposition of the metal material forming the metal film 50P onto the top surface of the mask layer 61. The metal film 50P further includes a third deposition part 50P4. The third deposition part 50P4 includes a portion that is formed on the top surface 22a of the gap layer 22 and that is to later become the width changing portion 52 of the plasmon generator 50. The third deposition part 50P4 is formed by the deposition of the metal material forming the metal film 50P onto the top surface 22a of the gap layer 22. The third deposition part 50P4 is continuous with the first deposition part 50P2. In FIG. 7A, the boundary between the first deposition part 50P2 and the third deposition part 50P4 is shown by a dotted line. In FIG. 7B, the boundary between the adhesion part 50P1 and the first deposition part 50P2 and the boundary between the adhesion part 50P1 and the second deposition part 50P3 are shown by respective dotted lines. Part of the second deposition part 50P3 lies on the mask layer 61.

The adhesion part 50P1 includes a first contact surface 50P1a that is in contact with the first sidewall 241Pb. The first contact surface 50P1a is to later become the first side surface 51c of the propagation part 51.

Figure 8A:
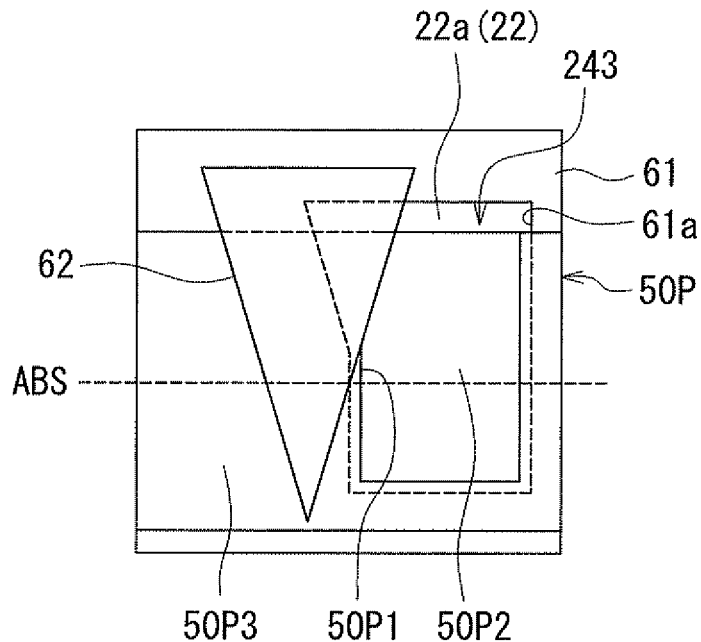
FIG. 8A and FIG. 8B are explanatory diagrams showing a step that follows the step shown in FIG. 7A and FIG. 7B.
Figure 8B:
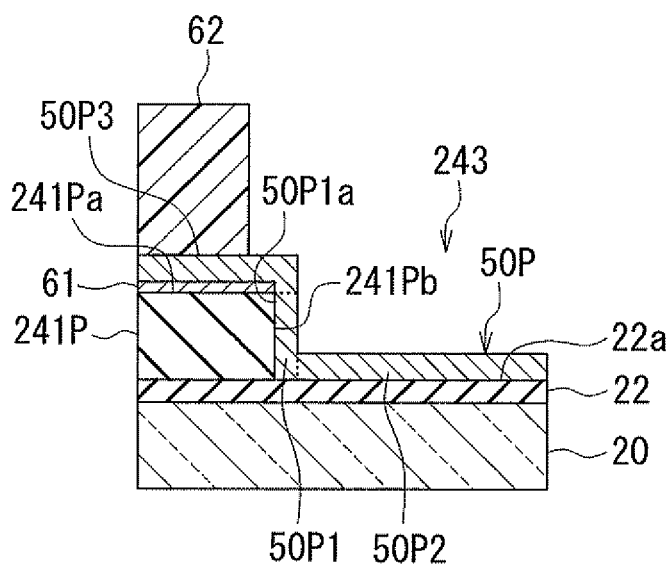

FIG. 8A and FIG. 8B show the next step. In this step, a photoresist mask 62 having a triangular planar shape, for example, is formed on the metal film 50P. The photoresist mask 62 is formed by patterning a photoresist layer by photolithography. The photoresist mask 62 covers the portion of the third deposition part 50P4 that is to later become the width changing portion 52, and a portion of the second deposition part 50P3. The photoresist mask 62 has a wall face for defining the position of the second side surface 52d of the width changing portion 52.

Figure 9A:
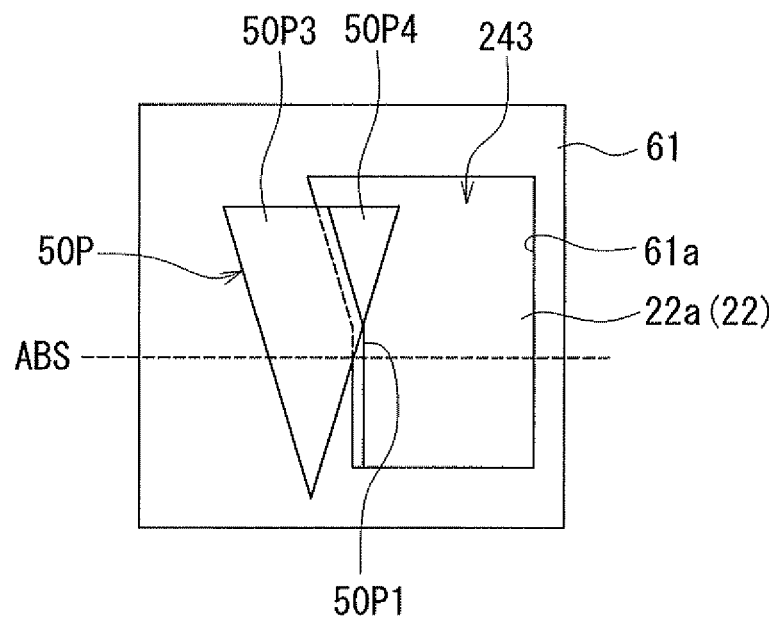
FIG. 9A and FIG. 9B are explanatory diagrams showing a step that follows the step shown in FIG. 8A and FIG. 8B.
Figure 9B:
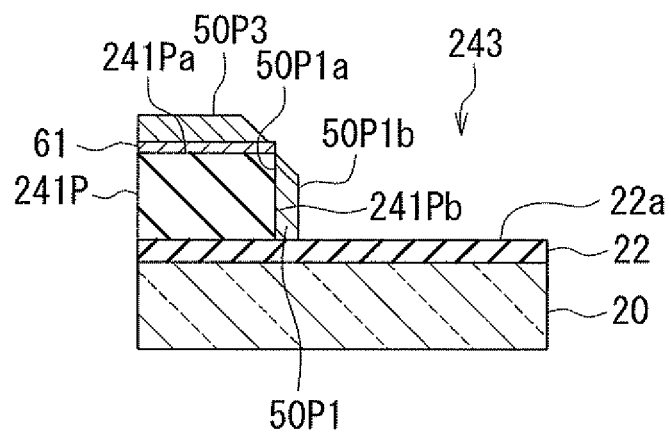

FIG. 9A and FIG. 9B show the next step. In this step, first, using the photoresist mask 62 as an etching mask, the metal film 50P is etched by, for example, IBE such that the adhesion part 50P1 remains. When etching the metal film 50P by IBE, the direction of travel of the ion beam may be tilted with respect to the direction perpendicular to the top surface 1a of the substrate 1. The direction of travel of the ion beam forms an angle in the range of, for example, 0° to 20°, and preferably in the range of 0° to 5°, with respect to the direction perpendicular to the top surface 1a of the substrate 1. As a result of this etching, the portion of the metal film 50P lying under the photoresist mask 62 and the adhesion part 50P1 of the metal film 50P remain, whereas the first deposition part 50P2 of the metal film 50P is removed. This provides the adhesion part 50P1 with a second contact surface 50P1b to be in contact with the second sidewall to be formed later. The second contact surface 50P1b is to later become the second side surface 51d of the propagation part 51. In this step, the surface of the adhesion part 50P1 may be etched to reduce the width of the adhesion part 50P1. Next, the photoresist mask 62 is removed.

Figure 10A:
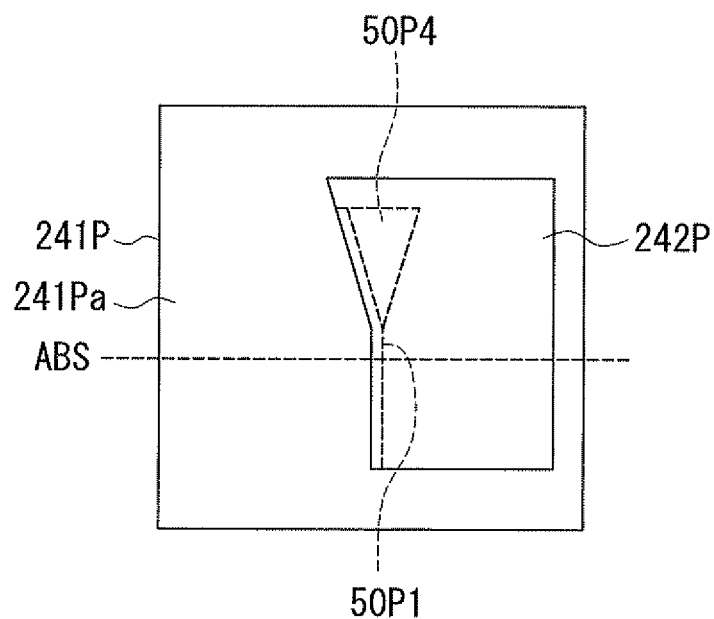
FIG. 10A and FIG. 10B are explanatory diagrams showing a step that follows the step shown in FIG. 9A and FIG. 9B.
Figure 10B:
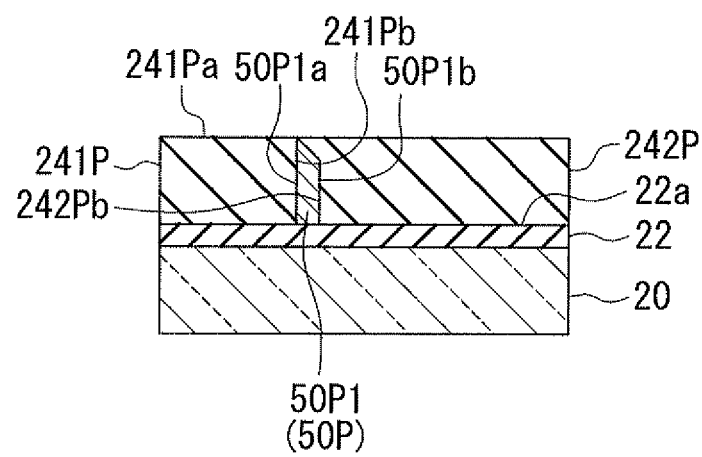

FIG. 10A and FIG. 10B show the next step. In this step, first, a filler layer 242P of a dielectric material is formed in the opening 243. The filler layer 242P has a second sidewall 242Pb disposed such that the adhesion part 50P1 is interposed between the first sidewall 241Pb of the protruding part 241P and the second sidewall 242Pb. The second contact surface 50P1b of the adhesion part 50P1 is in contact with the second sidewall 242Pb. The filler layer 242P may be formed of, for example, the same material as that of the protruding part 241P (the layer to be etched 240P). The filler layer 242P is to later become the second portion 242 of the dielectric layer 24.

Next, respective portions of the protruding part 241P, the filler layer 242P and the metal film 50P that are located away from the top surface 22a of the gap layer 22 are removed. This step will now be described in detail with reference to FIG. 10A, FIG. 10B, FIG. 11A, and FIG. 11B. In this step, first, as shown in FIG. 10A and FIG. 10B, the metal film 50P and the mask layer 61 are polished by, for example, CMP, until the top surface 241Pa of the protruding part 241P is exposed. The second deposition part 50P3 and the mask layer 61 are thereby removed, and the top surface 241Pa of the protruding part 241P and the top surface of the filler layer 242P are thereby made even with each other.

Figure 11A:
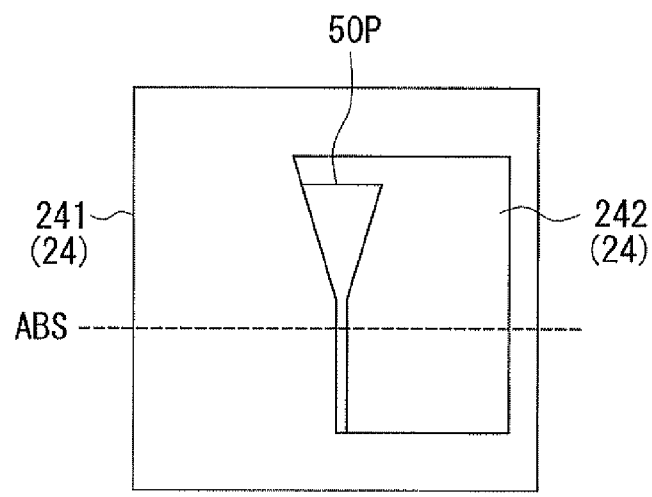
FIG. 11A and FIG. 11B are explanatory diagrams showing a step that follows the step shown in FIG. 10A and FIG. 10B.
Figure 11B:
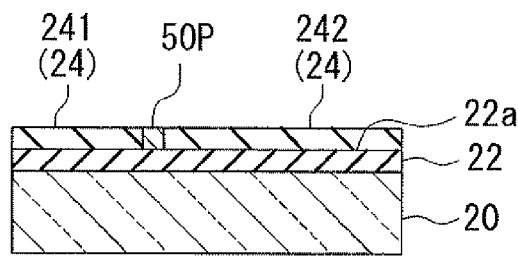

FIG. 11A and FIG. 11B show the next step. In this step, the protruding part 241P, the filler layer 242P and the metal film 50P are partially etched into a desired thickness by, for example, IBE. When etching the protruding part 241P, the filler layer 242P and the metal film 50P by IBE, the direction of travel of the ion beam is tilted with respect to the direction perpendicular to the top surface 1a of the substrate 1. For example, the direction of travel of the ion beam forms an angle of 65° with respect to the direction perpendicular to the top surface 1a of the substrate 1. This etching makes the protruding part 241P into the first portion 241 of the dielectric layer 24, and the filler layer 242P into the second portion 242 of the dielectric layer 24.

Next, a portion of the metal film 50P is etched to form the inclined portion 51b1 of the top surface 51b of the propagation part 51. In this step, first formed is a photoresist mask covering at least a portion of the top surface of the metal film 50P that is to later become the top surface 52b of the width changing portion 52. The photoresist mask is formed by patterning a photoresist layer by photolithography. Then, using this photoresist mask as an etching mask, another portion of the top surface of the metal film 50P that is not covered with the photoresist mask is taper-etched by, for example, IBE. The inclined portion 51b1 is thereby formed. Then, the photoresist mask is removed. The plasmon generator 50 is completed through a series of steps described above.

As has been described, the step forming the plasmon generator 50 in the method of manufacturing the near-field light generator according to the present embodiment and the method of manufacturing the plasmon generator 50 according to the present embodiment each include the steps of: forming the protruding part 241P of a dielectric material on the top surface 22a of the gap layer 22; forming the metal film 50P, which is to later become the plasmon generator 50, after the step of forming the protruding part 241P; and forming the filler layer 242P of a dielectric material after the step of forming the metal film 50P. The protruding part 241P has the top surface 241Pa different in level from the top surface 22a of the gap layer 22, and the first sidewall 241Pb connecting the top surface 241Pa of the protruding part 241P and the top surface 22a of the gap layer 22 to each other. The metal film 50P includes the adhesion part 50P1 adhering to the first sidewall 241Pb. The filler layer 242P has the second sidewall 242Pb disposed such that the adhesion part 50P1 is interposed between the first sidewall 241Pb and the second sidewall 242Pb. The adhesion part 50P1 includes the first contact surface 50P1a in contact with the first sidewall 241Pb and the second contact surface 50P1b in contact with the second sidewall 242Pb. The first contact surface 50P1a becomes the first side surface 51c of the propagation part 51, and the second contact surface 50P1b becomes the second side surface 51d of the propagation part 51.

According to the present embodiment, the metal film 50P formed in the step of forming the metal film 50P has the adhesion part 50P1 adhering to the first sidewall 241Pb, and the width of the adhesion part 50P1 defines the width of the propagation part 51 of the plasmon generator 50. The width of the adhesion part 50P1 can be easily reduced regardless of the limit of photolithography. Consequently, according to the present embodiment, it is possible to manufacture the plasmon generator 50 whose front end face 51e including the near-field light generating part 51g is small in width.

The other effects provided by the present embodiment will now be described. In the present embodiment, the plasmon generator 50 has the propagation part 51 and the width changing portion 52. The width of the bottom surface 52a of the width changing portion 52 facing the top surface 20b of the core 20 decreases with increasing proximity to the medium facing surface 40, and becomes equal to the width of the bottom surface 51a at the boundary with the bottom surface 51a. The present embodiment allows the bottom surface of the plasmon generator 50 facing the top surface 20b of the core 20 to be larger in area to allow more surface plasmons to be excited than in the case where the width changing portion 52 is not provided. Consequently, according to the present embodiment, it is possible to generate near-field light of sufficient intensity.

As the plasmon generator 50 is reduced in thickness (dimension in the Z direction), the excitation efficiency of surface plasmons is decreased to cause less surface plasmons to be excited. For this reason, the thickness of the plasmon generator 50 is preferably increased to some extent. In the present embodiment, the top surface 51b of the propagation part 51 includes the inclined portion 51b1. The distance from the bottom surface 51a of the propagation part 51 to an arbitrary point on the inclined portion 51b1 decreases with decreasing distance from the arbitrary point to the front end face 51e. According to the present embodiment, it is thereby possible to reduce the dimension of the front end face 51e in the Z direction while increasing the thickness of a portion of the plasmon generator 50 away from the medium facing surface 40. Consequently, according to the present embodiment, it is possible to produce near-field light having a small spot diameter and sufficient intensity.

[Second Embodiment]

Reference is now made to FIG. 12 to FIG. 16 to describe the step of forming the plasmon generator 50 in a method of manufacturing the near-field light generator according to a second embodiment of the invention and a method of manufacturing the plasmon generator 50 according to the second embodiment of the invention. FIG. 13A and FIG. 14A each show the top surface of a stack of layers formed in the method of manufacturing the near-field light generator. FIG. 12, FIG. 13B, FIG. 14B, FIG. 15, and FIG. 16 each show a cross section of the stack taken in the position where the medium facing surface 40 is to be formed. The symbol "ABS" in FIG. 13A and FIG. 14A indicates the position where the medium facing surface 40 is to be formed.

Figure 12:
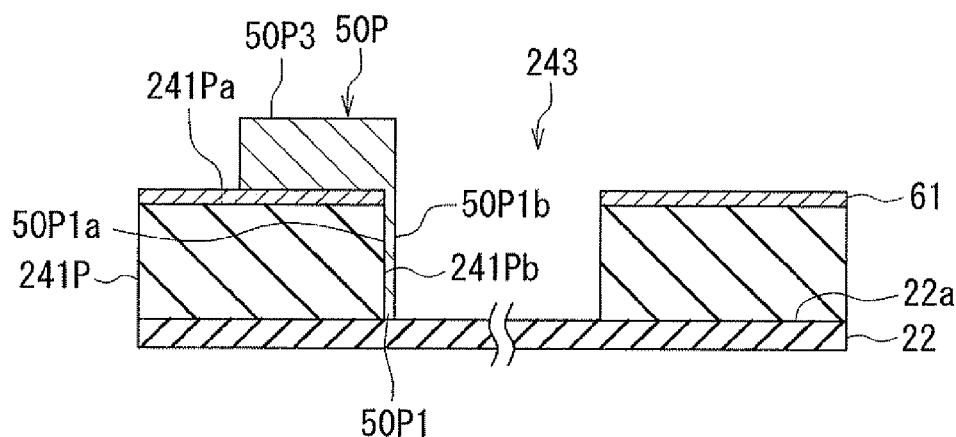
FIG. 12 is a cross-sectional view showing a step of a method of manufacturing a near-field light generator according to a second embodiment of the invention.

The process for forming the plasmon generator 50 of the present embodiment is the same as that of the first embodiment up to the step of removing the photoresist mask 62 (see FIG. 9A and FIG. 9B). FIG. 12 illustrates a stack of layers with the photoresist mask 62 removed. In the present embodiment, the rim of the opening 61a of the mask layer 61 that is formed in the step shown in FIG. 6A and FIG. 6B includes a portion for defining the position of the first sidewall 241Pb and a portion for defining the position of the side surface 52c and the rear end face 52e of the width changing portion 52.

Figure 13A:
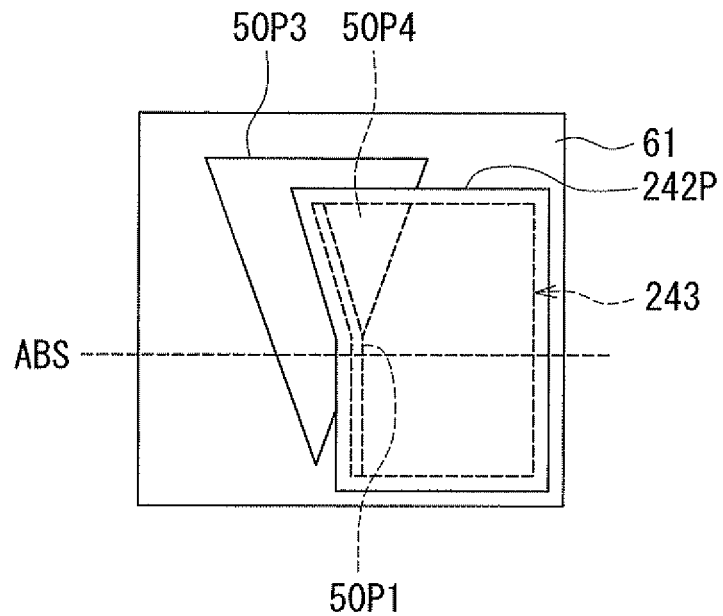
FIG. 13A and FIG. 13B are explanatory diagrams showing a step that follows the step shown in FIG. 12.
Figure 13B:
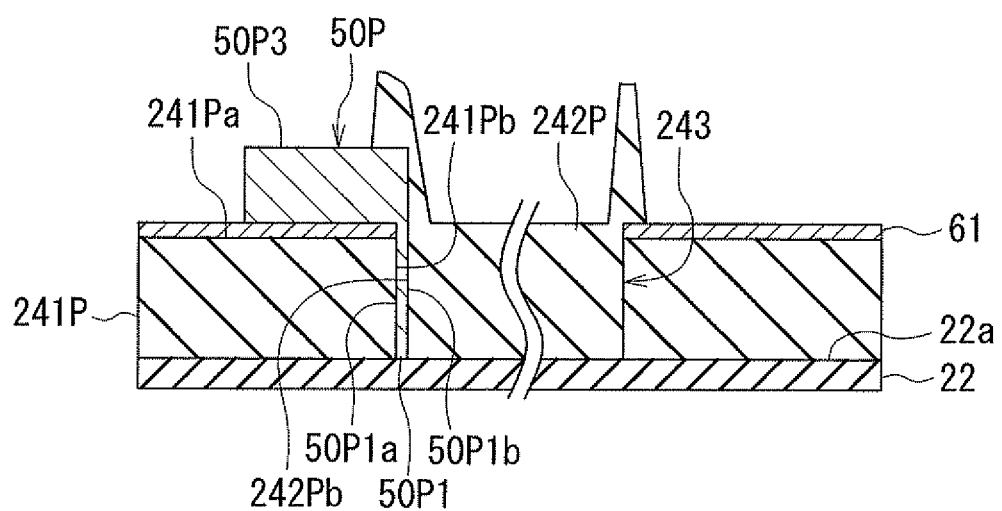

FIG. 13A and FIG. 13B show a step that follows the removal of the photoresist mask 62. In this step, first, a not-shown photoresist mask is formed on the stack shown in FIG. 12. This photoresist mask has an opening for exposing the opening 243 (see FIG. 6A and FIG. 6B) formed in the layer to be etched 240P, and also exposing a region wider than the opening 243. The photoresist mask is formed by patterning a photoresist layer by photolithography. Next, a filler layer 242P of a dielectric material is formed in the opening of the photoresist mask. The filler layer 242P is formed in the opening 243 and on top of the mask layer 61 and the second deposition part 50P3. The filler layer 242P is formed such that the top surface of the portion of the filler layer 242P formed in the opening 243 is almost flush with the top surface 241Pa of the protruding part 241P. Next, the not-shown photoresist mask is removed.

Figure 14A:
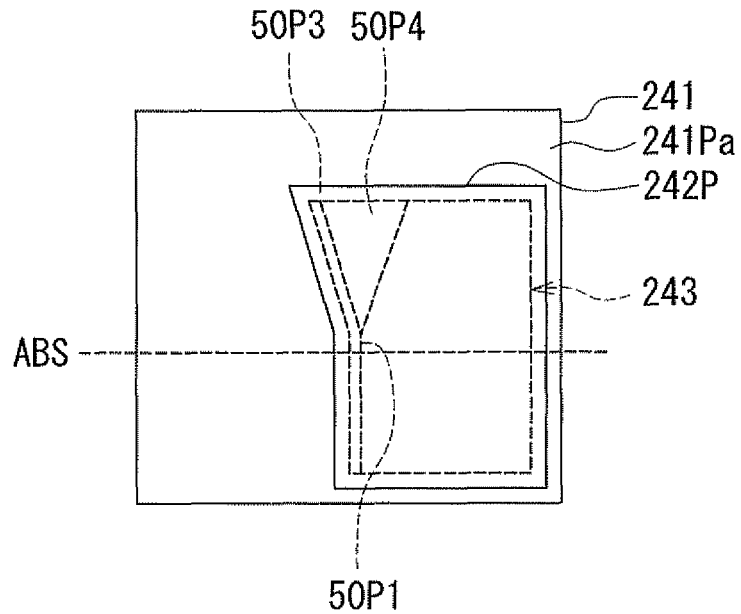
FIG. 14A and FIG. 14B are explanatory diagrams showing a step that follows the step shown in FIG. 13A and FIG. 13B.
Figure 14B:
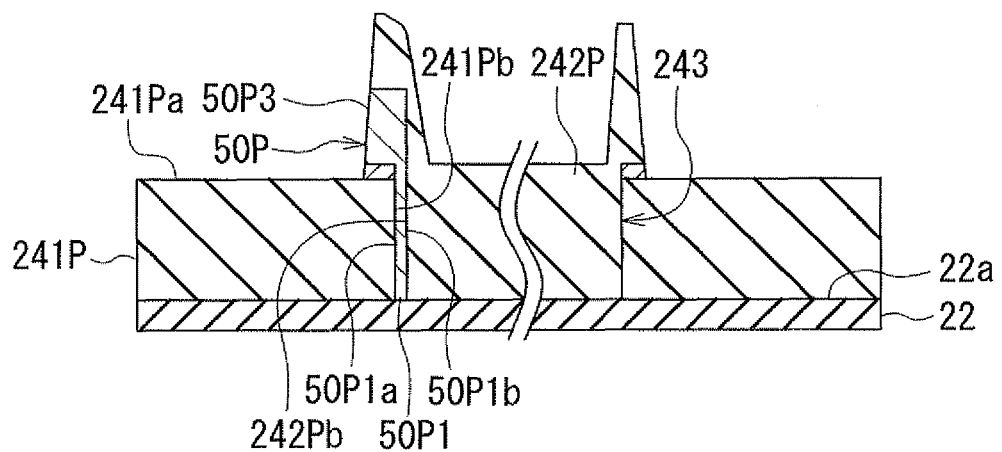

Next, respective portions of the protruding part 241P, the filler layer 242P and the metal film 50P that are located away from the top surface 22a of the gap layer 22 are removed. This step will be described in detail below with reference to FIG. 14A, FIG. 14B, FIG. 15, and FIG. 16. FIG. 14A and FIG. 14B show a step that follows the removal of the photoresist mask after the filler layer 242P has been formed in the opening of the photoresist mask. In this step, the second deposition part 50P3 and the mask layer 61 except their respective portions lying under the filler layer 242P are etched by RIE or IBE, for example. Note that a photoresist mask covering the filler layer 242P may be formed and used as the etching mask. This etching step corresponds to the "first etching step" according to the invention.

Figure 15:
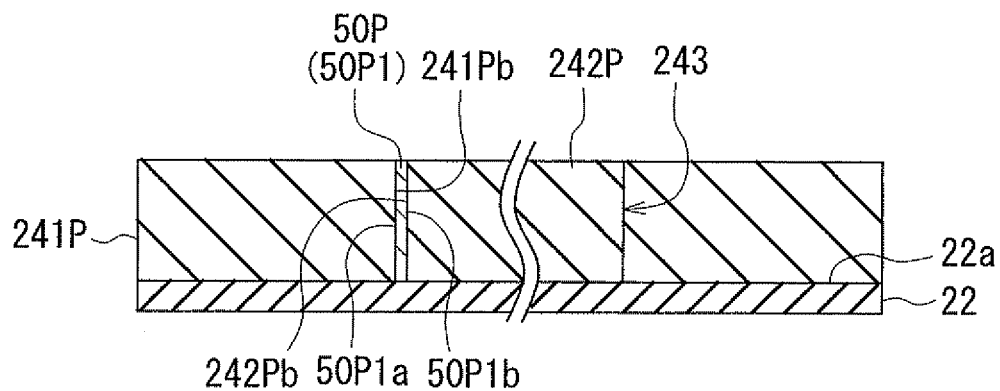
FIG. 15 is a cross-sectional view showing a step that follows the step shown in FIG. 14A and FIG. 14B.

FIG. 15 shows the next step. In this step, the protruding part 241P, the filler layer 242P, the metal film 50P and the mask layer 61 are polished by, for example, CMP. The second deposition part 50P3 and the mask layer 61 are thereby removed, and the top surface 241Pa of the protruding part 241P and the top surface of the filler layer 242P are thereby made even with each other.

Figure 16:
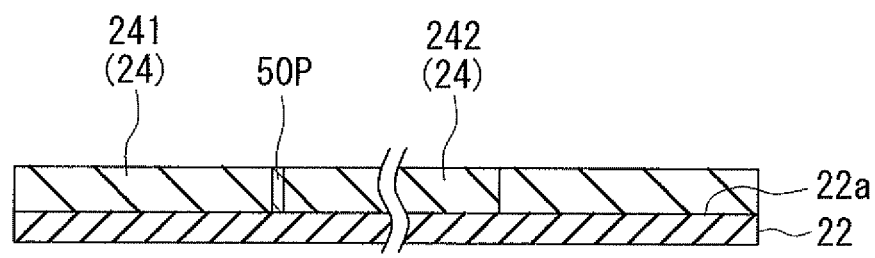
FIG. 16 is a cross-sectional view showing a step that follows the step shown in FIG. 15.

FIG. 16 shows the next step. In this step, the protruding part 241P, the filler layer 242P and the metal film 50P are partially etched into a desired thickness by, for example, IBE. When etching the protruding part 241P, the filler layer 242P and the metal film 50P by IBE, the direction of travel of the ion beam is tilted with respect to the direction perpendicular to the top surface 1a of the substrate 1. For example, the direction of travel of the ion beam forms an angle of 65° with respect to the direction perpendicular to the top surface 1a of the substrate 1. This etching makes the protruding part 241P into the first portion 241 of the dielectric layer 24, and the filler layer 242P into the second portion 242 of the dielectric layer 24. This etching step corresponds to the "second etching step" according to the invention. The subsequent steps are the same as those in the first embodiment.

The effects of the present embodiment will now be described. When polishing the protruding part 241P, the filler layer 242P and the metal film 50P by, for example, CMP, the polishing rate of the protruding part 241P and the filler layer 242P, which are formed of a dielectric material, does not always agree with the polishing rate of the metal film 50P and the mask layer 61, which are formed of a metal material. Even when the protruding part 241P and the filler layer 242P are formed of the same material, a difference in film quality between the two may cause the polishing rate of the filler layer 242P to be higher than that of the protruding part 241P. Accordingly, if the polishing step shown in FIG. 15 requires a long polishing time, then the top surface of the portion of the filler layer 242P formed in the opening 243 may be recessed, and as a result, the adhesion part 50P1 of the metal film 50P may undergo polishing.

In contrast to this, in the present embodiment, a portion of each of the second deposition part 50P3, the metal film 50P and the mask layer 61 is etched and removed in the first etching step. This makes it possible to shorten the polishing time in the polishing step of FIG. 15 and thereby prevents the aforementioned problem.

The remainder of configuration, function and effects of the present embodiment are similar to those of the first embodiment.

The present invention is not limited to the foregoing embodiments, and various modifications may be made thereto. For example, the method of manufacturing the plasmon generator of the present invention is also applicable to the manufacture of a plasmon generator in a near-field light generator that is configured so that the bottom surface of the core of the waveguide faces the top surface of the plasmon generator with a dielectric layer therebetween.

It is apparent that the present invention can be carried out in various forms and modifications in the light of the foregoing descriptions.

Accordingly, within the scope of the following claims and equivalents thereof, the present invention can be carried out in forms other than the foregoing most preferable embodiments.

What is claimed is:

1. A method of manufacturing a plasmon generator, the plasmon generator including a propagation part for propagating a surface plasmon that is excited based on light, the propagation part having a bottom surface, a top surface opposite to the bottom surface, a first side surface and a second side surface that are opposite to each other and connect the top and bottom surfaces to each other, and a front end face that connects the top surface, the bottom surface, the first side surface and the second side surface to each other, the front end face including a near-field light generating part that generates near-field light based on the surface plasmon, the method comprising the steps of:

forming a base part that is made of a dielectric material and has a base surface and a protruding part, the protruding part protruding from the base surface and having a top surface and a first sidewall, the top surface of the protruding part being different from the base surface in level, the first sidewall connecting the top surface of the protruding part and the base surface to each other;

forming a metal film after the step of forming the base part, the metal film becoming the plasmon generator and including an adhesion part adhering to the first sidewall; and forming a filler layer after the step of forming the metal film, the filler layer being made of a dielectric material and having a second sidewall disposed such that the adhesion part is interposed between the first sidewall and the second sidewall, wherein the adhesion part includes a first contact surface that is in contact with the first sidewall, and a second contact surface that is in contact with the second sidewall, the first contact surface becoming the first side surface of the propagation part, the second side surface becoming the second side surface of the propagation part.

2. The method of manufacturing the plasmon generator according to claim 1, wherein the metal film is formed by physical vapor deposition.

3. The method of manufacturing the plasmon generator according to claim 1, wherein the metal film further includes a first deposition part formed on the base surface such that the adhesion part is interposed between the first sidewall and the first deposition part, the method further comprising the step of removing the first deposition part between the step of forming the metal film and the step of forming the filler layer.

4. The method of manufacturing the plasmon generator according to claim 1, further comprising the step of removing respective portions of the protruding part, the filler layer and the metal film that are located away from the base surface, the step of removing being performed after the step of forming the filler layer.

5. The method of manufacturing the plasmon generator according to claim 4, wherein the step of removing includes a step of polishing the protruding part, the filler layer and the metal film.

6. The method of manufacturing the plasmon generator according to claim 5, wherein the step of removing further includes a step of partially etching the protruding part, the filler layer and the metal film after the step of polishing.

7. The method of manufacturing the plasmon generator according to claim 4, wherein:

the metal film further includes a second deposition part formed at a position farther from the base surface than a position at which the adhesion part is formed; and the step of removing includes:

a first etching step of etching at least a portion of the second deposition part;

a step of polishing the protruding part, the filler layer and the metal film after the first etching step; and a second etching step of partially etching the protruding part, the filler layer and the metal film after the step of polishing.

8. The method of manufacturing the plasmon generator according to claim 1, wherein:

the plasmon generator includes a width changing portion that is located on a side of the propagation part farther from the front end face and is connected to the propagation part; and the width changing portion has a width in a direction parallel to the bottom surface and the front end face of the propagation part, the width of the width changing portion decreasing with increasing proximity to the front end face.

9. The method of manufacturing the plasmon generator according to claim 1, wherein the step of forming the base part includes:

a step of forming an etching stopper layer having the base surface;

a step of forming a layer to be etched on the etching stopper layer, the layer to be etched being made of a material different from a material of the etching stopper layer; and a step of forming the protruding part by etching a portion of the layer to be etched, with the etching stopper layer used as an etching stopper.

10. The method of manufacturing the plasmon generator according to claim 1, wherein the top surface of the propagation part includes an inclined portion, and a distance from the bottom surface of the propagation part to an arbitrary point on the inclined portion decreases with decreasing distance from the arbitrary point to the front end face, the method further comprising the step of forming the inclined portion by etching a portion of the metal film, after the step of forming the filler layer.

11. A method of manufacturing a near-field light generator, the near-field light generator including a waveguide and a plasmon generator, wherein:
the waveguide includes a core through which light propagates, and a cladding surrounding the core;
the core has a top surface;
the cladding includes a gap layer made of a dielectric material and having a top surface, the gap layer being disposed on the top surface of the core;
the plasmon generator is disposed on the top surface of the gap layer; and
the plasmon generator includes a propagation part for propagating a surface plasmon that is excited based on the light propagating through the core, the propagation part having a bottom surface, a top surface opposite to the bottom surface, a first side surface and a second side surface that are opposite to each other and connect the top and bottom surfaces to each other, and a front end face that connects the top surface, the bottom surface, the first side surface and the second side surface to each other, the front end face including a near-field light generating part that generates near-field light based on the surface plasmon,
the method comprising the steps of:
forming the waveguide;
forming a protruding part on the top surface of the gap layer, the protruding part being made of a dielectric material and having a top surface and a first sidewall, the top surface of the protruding part being different from the top surface of the gap layer in level, the first sidewall connecting the top surface of the protruding part and the top surface of the gap layer to each other;
forming a metal film after the step of forming the protruding part, the metal film becoming the plasmon generator and including an adhesion part adhering to the first sidewall; and
forming a filler layer after the step of forming the metal film, the filler layer being made of a dielectric material and having a second sidewall disposed such that the adhesion part is interposed between the first sidewall and the second sidewall,
wherein the adhesion part includes a first contact surface that is in contact with the first sidewall, and a second contact surface that is in contact with the second sidewall, the first contact surface becoming the first side surface of the propagation part, the second contact surface becoming the second side surface of the propagation part.

12. The method of manufacturing the near-field light generator according to claim 11, wherein the metal film is formed by physical vapor deposition.

13. The method of manufacturing the near-field light generator according to claim 11, wherein the metal film further includes a first deposition part formed on the top surface of the gap layer such that the adhesion part is interposed between the first sidewall and the first deposition part,
the method further comprising the step of removing the first deposition part between the step of forming the metal film and the step of forming the filler layer.

14. The method of manufacturing the near-field light generator according to claim 11, further comprising the step of removing respective portions of the protruding part, the filler layer and the metal film that are located away from the top surface of the gap layer, the step of removing being performed after the step of forming the filler layer.

15. The method of manufacturing the near-field light generator according to claim 14, wherein the step of removing includes a step of polishing the protruding part, the filler layer and the metal film.

16. The method of manufacturing the near-field light generator according to claim 15, wherein the step of removing further includes a step of partially etching the protruding part, the filler layer and the metal film after the step of polishing.

17. The method of manufacturing the near-field light generator according to claim 14, wherein:
the metal film further includes a second deposition part formed at a position farther from the top surface of the gap layer than a position at which the adhesion part is formed; and
the step of removing includes:
a first etching step of etching at least a portion of the second deposition part;
a step of polishing the protruding part, the filler layer and the metal film after the first etching step; and
a second etching step of partially etching the protruding part, the filler layer and the metal film after the step of polishing.

18. The method of manufacturing the near-field light generator according to claim 11, wherein:
the plasmon generator includes a width changing portion that is located on a side of the propagation part farther from the front end face and is connected to the propagation part; and
the width changing portion has a width in a direction parallel to the bottom surface and the front end face of the propagation part, the width of the width changing portion decreasing with increasing proximity to the front end face.

19. The method of manufacturing the near-field light generator according to claim 11, wherein the step of forming the protruding part includes:
a step of forming a layer to be etched on the top surface of the gap layer, the layer to be etched being made of a material different from a material of the gap layer; and
a step of forming the protruding part by etching a portion of the layer to be etched, with the gap layer used as an etching stopper.

20. The method of manufacturing the near-field light generator according to claim 11, wherein the top surface of the propagation part includes an inclined portion, and a distance from the bottom surface of the propagation part to an arbitrary point on the inclined portion decreases with decreasing distance from the arbitrary point to the front end face,
the method further comprising the step of forming the inclined portion by etching a portion of the metal film, after the step of forming the filler layer.

* * * * *